Figure 1:
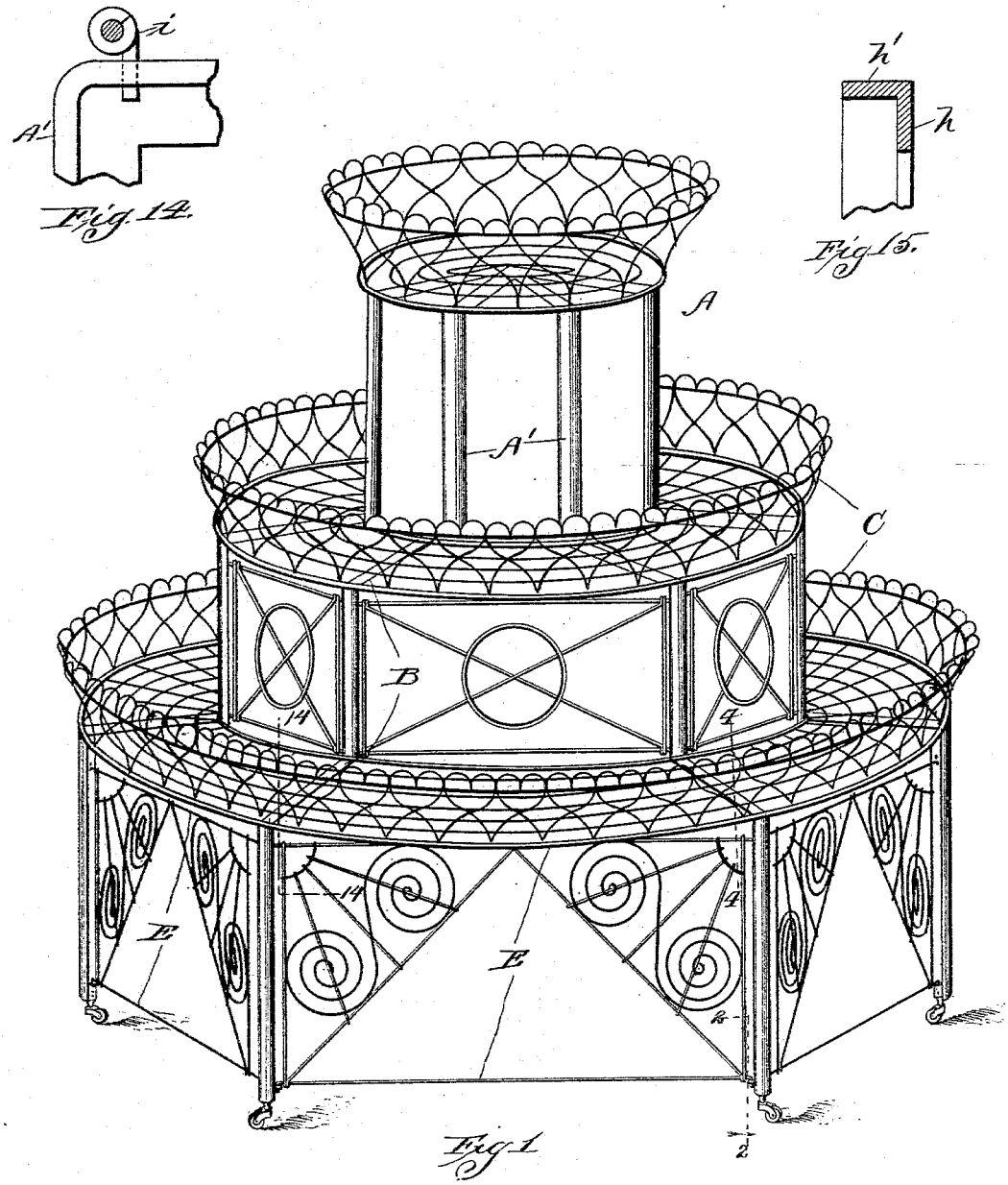

(No Model.) 2 Sheets—Sheet 1.

L. G. BEERS.
FLOWER STAND.

No. 494,730. Patented Apr. 4, 1893.

Witnesses:
John L. Gunison
Martin H. Olsen

Inventor:
Louis G. Beers
By Chas. C. Tillman
Atty (No Model.) 2 Sheets—Sheet 2.
L. G. BEERS.
FLOWER STAND.
No. 494,730. Patented Apr. 4, 1893.
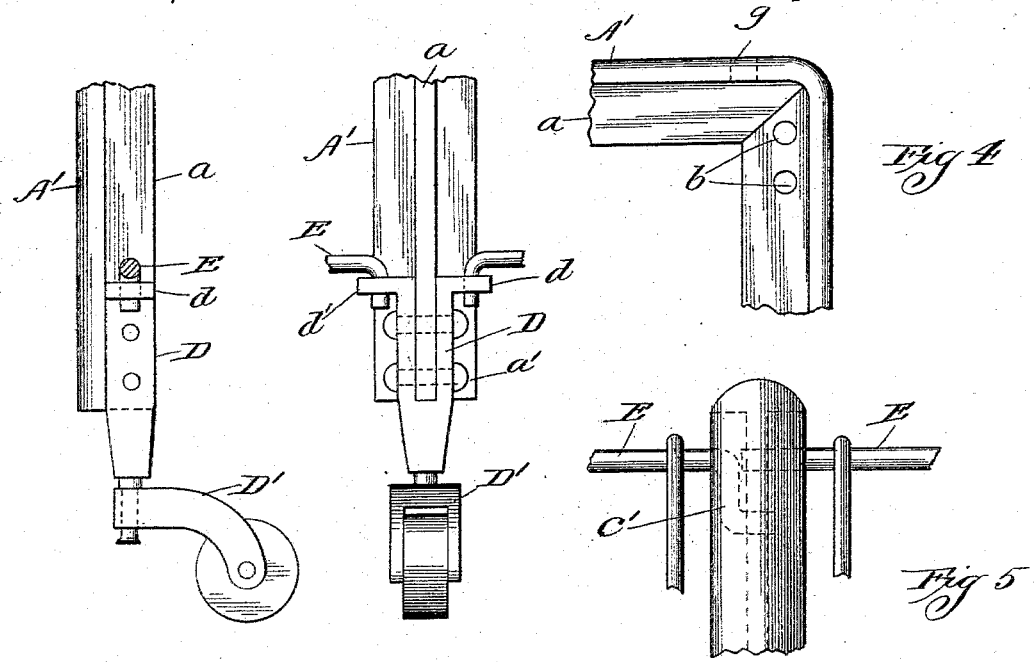
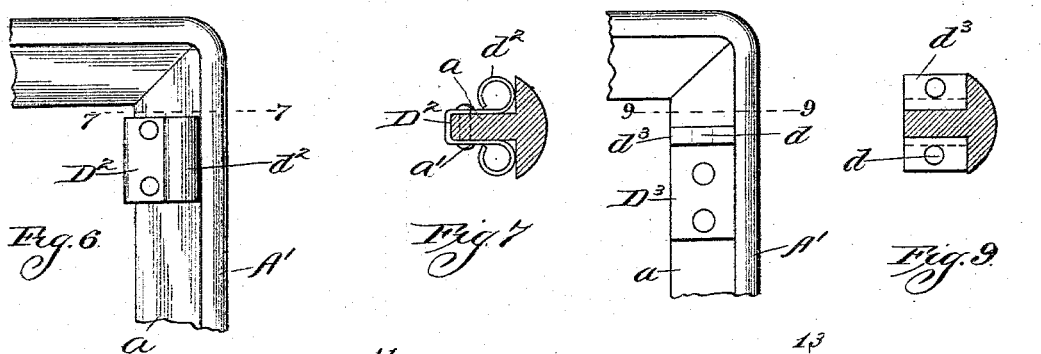
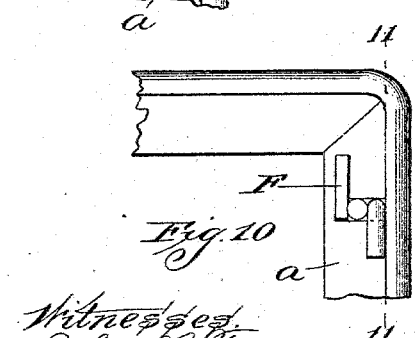
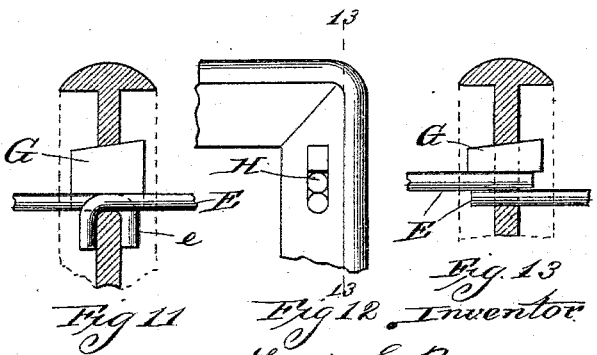
Witnesses:
John L. Johnson
Martin H. Olsen
Inventor
Louis G. Beers
By Chas. C. Tillman, Atty.

UNITED STATES PATENT OFFICE.

LOUIS G. BEERS, OF CHICAGO, ILLINOIS.

FLOWER-STAND.

SPECIFICATION forming part of Letters Patent No. 494,730, dated April 4, 1893.

Application filed September 8, 1892. Serial No. 445,294. (No model.)

*To all whom it may concern:*

Be it known that I, LOUIS G. BEERS, a citizen of the United States, residing at Chicago, in the county of Cook and State of Illinois, have invented certain new and useful Improvements in Flower-Stands, of which the following is a specification.

This invention relates to improvements in flower stands, and is more especially adapted to that class known as knock-down or collapsible stands, and consists in certain peculiarities of the construction, operation, and novel arrangement of the various parts thereof, as will be hereinafter more fully set forth and specifically claimed.

The objects of this invention are first, to provide a stand which shall be strong and durable, neat and attractive in appearance, yet simple and inexpensive in construction; second, such a stand which by reason of its peculiar construction, will be firmly braced, and stronger than the ordinary stands now in use; and third, a flower stand, the parts of which may be readily detached one from the other, thus allowing them to be packed into a small compass for shipment, and also allowing the various parts to be galvanized or dipped into a bath of metal coating.

In order to enable others skilled in the art, to which my invention pertains to make and use the same, I will now proceed to describe it, referring to the accompanying drawings, in which—

Figure 1, is a front view of my flower stand as it appears when completed. Fig. 2, is a side view of the lower portion of one of the supporting legs of the stand, taken on line 2, 2, of Fig. 1, showing the manner of securing the brace-rods thereto. Fig. 3, is a rear view thereof. Fig. 4, is a side view of the upper portion or elbow of one of the legs or steps, taken on line 4, 4, of Fig. 1, showing the holes therein for the reception of the brace-rods. Fig. 5, is a front view thereof, showing the brace-rods in position. Figs. 6, 8, 10, and 12, are side views of the upper portion or elbow of one of the steps illustrating modifications in the manner of securing the brace-rods thereto. Fig. 7, is a sectional view, taken on line 7, 7, of Fig. 6. Fig. 9, is a sectional view, taken on line 9, 9, of Fig. 8. Fig. 11, is a vertical sectional view, taken on line 11, 11, of Fig. 10. Fig. 13, is a vertical sectional view, taken on line 13, 13, of Fig. 12. Fig. 14, is a side view of a portion of one of the steps or supports, taken on line 14, 14, of Fig. 1, showing the manner of securing the basket or flower-pot receptacle thereto, and Fig. 15 is an end sectional view, showing a modification in the form or construction of the legs or steps.

Similar letters refer to like parts throughout the different views of the drawings.

A, represents the main frame of my stand, which is constructed of a number of supporting legs or steps A', which are made of any suitable material, but preferably of iron, and are bent as shown in Fig. 1, at proper intervals one above the other to form seats or rests B, upon, and to which, the baskets or flower-pot receptacles C, may rest and be secured. The supporting legs or steps A', may be of any desired form, but I prefer to construct them on account of the additional strength attained thereby, of material substantially T-shaped in cross section.

To the lower portion of the ribs $a$, of each of the supporting legs or steps A', is secured by means of rivets $a'$, or otherwise if desired, a bifurcated clamp or clasp D, which strides the rib $a$, and has vertically at its upper end outwardly extending lips $d$, which are provided with openings $d'$, for the reception and retention of brace-rods E, and may be provided at its lower end with a caster D', to enable the stand to be easily moved from one place to another.

Just below the lower rests B, the upright portions of the supporting legs A', are formed or provided with holes $b$, $b$, one preferably above the other, for the reception of the upper brace-rods E, which extend horizontally from one of the supporting legs A', to the other and unite the same.

By reference to Fig. 1, of the drawings, it will be seen and understood that both the upper and lower portions of the supporting legs A', extending from the lower rest B, to the one above it, are provided with holes $b$, $b$, for a like purpose, and that the same construction may be observed throughout the various series of rests which the stand may have.

In Fig. 5, I have shown the brace-rods E, in position, just below one of the elbows of the supporting legs, and in order to have said rods in alignment and to present a more attractive appearance, I may form the end of the rod which is placed in the lower hole, with a downward and outward curve, as shown in dotted lines at $c'$, while the other rod which fits in the upper hole is left straight.

In Figs. 6, and 7, I have shown a modification in the manner of securing the brace-rods to the supporting legs, which I may employ at the point just below the elbow of each of the supporting legs, or if desired also at the lower end of the same. This construction consists also of a bifurcated clamp $D^2$, having its free ends formed into eyelets $d^2$, for the reception of the ends of the brace-rods, which, when employed with this construction are bent downward at their ends, in order to fit in said eyes.

As shown in Figs. 6, and 7, the clamp $D^2$, strides the rib $a$, of the supporting leg laterally, and is secured thereto by means of rivets $a'$. Instead of using this modification I may employ for the upper portion of the supporting leg just below the elbows or at the lower end thereof, the clamp $D^3$, illustrated in Figs. 8, and 9, which is similar in construction, to that shown in Figs. 2, and 3, with the exception, that the lower end of said clamp, to which is secured the caster, is removed. This clamp is likewise provided with laterally extending lips $d^3$, which are provided with holes or openings $d'$, for the reception of the bent ends of the brace-rods.

In Figs. 10, and 11, I have shown another modification in the manner of securing the brace-rods E, to the supporting legs $A'$, which consists in forming the upper portion of the ribs $a$, at a point below the elbows of the supporting legs, with an L-shaped slot F, into the vertical portion of which slot the bent ends $e$, of the brace-rods are inserted, when the said rods may be placed within the horizontal portion of the slot F, and firmly secured therein by means of a wedge or plug G.

In Figs. 12, and 13, I have illustrated still another modification in the manner of securing the brace-rods to the supporting legs, which consists of a vertical slot H, within which is placed the ends of the brace-rods E, which are held in position by means of a plug or wedge G, which is driven between the upper or lower portion of the slot H, and one of the brace-rods.

As shown in Figs. 4, and 14, the upper surfaces of the rests B, are formed with one or more holes or openings $g$, for the reception and retention of the end of the wire or wires $i$, which are tied or otherwise secured to a portion of the basket or flower-pot receptacles C, and which extends into the openings $g$, and firmly yet removably secures in said basket to the main frame, as will be readily understood.

While I prefer to construct the supporting legs $A'$, of material substantially T-shaped in cross section, as shown Figs. 7, 9, 11, and 13, yet I may use material therefor of the form shown in Fig. 15, which is commonly known as "angle iron," and to the rib $h$, of which, the securing clamps may be attached, or said rib may be provided with any of the modified forms of openings for receiving the brace-rods. When the angle iron is employed for forming the supporting legs, it is bent in such a manner to form the rests B, so that the rib $h$, will present its edge inwardly, and the other side $h'$, of the angle outwardly, thus affording, both, in the angle, and T-shaped irons, a stronger support, than if ordinary flat or round irons were used, by reason of the fact, that the ribs of each present their edges inwardly, and are thereby less liable to bend or to yield to said weight.

In the drawings I have shown a circular flower stand, but it is obvious that I may construct the same of any desired shape, and that when it is desired to knock down the same, in order that it may be packed into the smallest compass, or in order that the various parts may be galvanized, or dipped into a bath, to metal coat them, it is only necessary to remove the baskets or flower-pot receptacles, which may be constructed of wire as shown in the drawings, or of any suitable material, and which may be placed or telescoped one within the other, for the purpose of shipping and the brace-rods may be removed from their bearings in the supporting legs, when the same may be placed together into a compact space.

Having thus fully described my invention, what I claim as new, and desire to secure by Letters Patent, is—

1. In a flower stand, the combination of a main frame composed of supporting legs, having ribs which present their edges inwardly, and are provided with rests upon which the flower-pot holders may rest, and at their lower ends with clamps which stride the rib $a$, of said legs, and are provided with bearings to receive the brace-rods, and which supporting legs have near their elbows openings or bearings to receive other brace-rods, with the brace-rods, substantially as and for the purpose set forth.

2. In a flower stand, the combination of the main frame A, composed of a number of supporting legs, having ribs which present their edges inwardly, and are provided with rests or ledges upon which the flower-pot holders may rest, and at their lower ends with clamps D, having the lips $d$, provided with openings $d'$, for the reception of the ends of the lower brace-rods, and near the elbows with openings $b$, for other brace-rods, with said rods, substantially as and for the purpose set forth.

3. In a flower stand, the combination of the main frame A, composed of a number of supporting legs or steps $A'$, made of material T shaped in cross section, and having ribs $a$, which present their edges inwardly and both horizontally and vertically, and are provided with rests B, and at their lower ends with clamps D, having the lips $d$, provided with openings $d'$, for the reception of the ends of the lower brace-rods, and near the elbows with bearings for other brace-rods, with said rods, substantially as and for the purpose set forth.

4. In a flower stand, the combination of the main frame A, composed of a number of supporting legs, provided with rests B, for the flower-pot receptacles, and at their lower ends with clamps having bearings for the reception of the ends of the lower brace-rods, and near their elbows with bearings for other brace-rods, with said rods secured in said bearings by means of wedges, substantially as and for the purpose set forth.

5. In a flower stand, the combination of the main frame A, composed of a number of supporting legs A', made of T shaped material in cross-section, and having ribs $a$, which present their edges vertically and horizontally, and are provided with rests B, having holes $g$, and at their lower ends with clamps D, having lips $d$, provided with openings $d'$, and near the elbows with bearings or openings, with the brace-rods E, and the receptacles C, having the wires or pins $i$, all constructed, arranged and operating substantially as and for the purpose set forth.

LOUIS G. BEERS.

Witnesses:
C. F. CRANZ,
CHAS. C. TILLMAN.